Nov. 13, 1962 R. A. LE MASSENA 3,063,350

RECORDER

Filed Aug. 11, 1958 2 Sheets-Sheet 1

INVENTOR.
ROBERT A. Le MASSENA
BY Arthur H. Swanson
ATTORNEY.

Nov. 13, 1962 R. A. LE MASSENA 3,063,350

RECORDER

Filed Aug. 11, 1958 2 Sheets-Sheet 2

INVENTOR.
ROBERT A. Le MASSENA

BY Arthur H. Swanson

ATTORNEY.

United States Patent Office 3,063,350

Patented Nov. 13, 1962

3,063,350

RECORDER

Robert A. Le Massena, Denver, Colo., assignor to Minneapolis-Honeywell Regulator Company, Minneapolis, Minn., a corporation of Delaware Filed Aug. 11, 1958, Ser. No. 754,234
2 Claims. (Cl. 95—1)

This invention relates to an apparatus for and a process of recording photographically which apparatus and process differ from practices known and heretofore used in the art. More specifically, this invention relates to an apparatus for and a process of making records of the variations with time of a beam of radiant energy by producing a trace or image on a film.

This invention makes it possible to record phenomena under observation on a film by means of a trace or image which becomes immediately visible by a process consisting of the three following steps. The first or pre-exposure step comprises conditioning the film to reveal a trace which becomes immediately visible by exposing the film to low-intensity radiant energy of suitable spectral composition for a suitable time so that the radiant energy produces on the film a pale but visible fog composed of the most sensitive or largest particles of the emulsion. The second or exposure step comprises exposing the film to high-intensity radiant energy of suitable spectral composition which produces the trace or image. The third or post-exposure step, called "latensification," comprises exposing the film to medium-intensity radiant energy of suitable spectral composition for a suitable time to render the trace immediately visible by greater contrast to the background.

Such a process is disclosed in U.S. Patent 3,035,912; patented May 22, 1962; application Serial No. 631,078; filed December 28, 1956; by Robert A. Le Massena and Richard S. Kampf.

It is an object of this invention to provide an apparatus for and a process of treating film, which has been exposed to the pre-exposure step and/or to the exposure step, by means of the post-exposure or latensification step.

More specifically, it is an object of this invention to provide an apparatus for and a process of exposing a film on which a trace or image has been recorded to radiant energy of such intensity and spectral composition that the trace or image produced on the film by the exposure step becomes immediately visible for all practical purposes without further processing and remains visible.

A further object of this invention is to provide an apparatus for and a process of exposing film on which a trace or image has been recorded to medium-intensity radiant energy of suitable spectral composition and intensity for a suitable time to render the trace immediately visible. The intensity of this illumination is varied and is less when the film is stationary and is greater when the film is moving.

It is a further object of this invention to provide apparatus for conditioning a film to reveal a visible trace or image thereon as rapidly as possible and independently of further processing, which apparatus comprises the following elements: a case which receives the film after the trace or image has been recorded on it; an electric motor in the case driving a spool upon which the film may be wound, and a source of illumination, such as one or more fluorescent electric lamps, which cast a substantially uniform illumination on the surface of the film.

A further object of this invention is to provide apparatus set forth in the preceding paragraph having at least two lamps. One of these lamps is interconnected with the power-supply of the trace or image producing means so that the lamp is illuminated when the trace or image producing means is energized. The other of these lamps and the motor of the film-treating apparatus are interconnected with the motor or the trace or image producing means, so that the lamp is illuminated and the motor energized, when the motor of the film-treating apparatus is energized so as to provide an increased degree of illumination when the film is moving.

The film illuminating apparatus and process of this invention is useful in connection with or as a part of a recording oscillograph producing the image or trace producing apparatus disclosed in U.S. Patent 2,580,427; patented January 1, 1952; to C. A. Heiland.

A better understanding of the present invention may be had from the following detailed description when read in connection with the accompanying drawings, in which.

Figure 1:
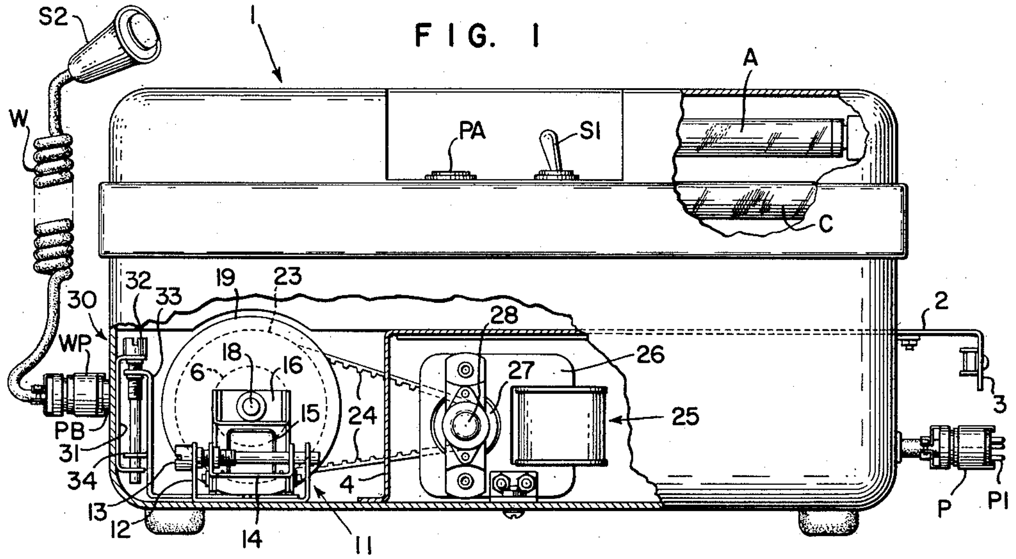
FIG. 1 is a side elevation with parts broken away to disclose the interior thereof.
Figure 2:
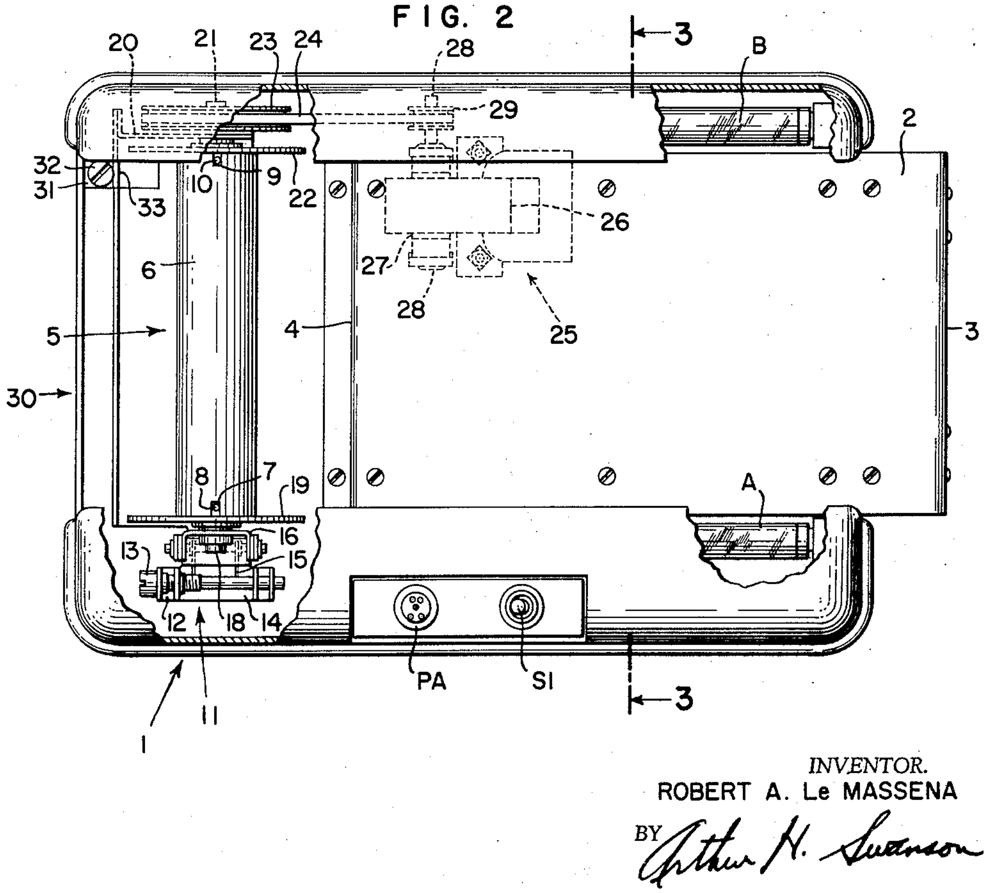
FIG. 2 is a top or plan view with parts broken away to disclose the interior thereof.
Figure 3:
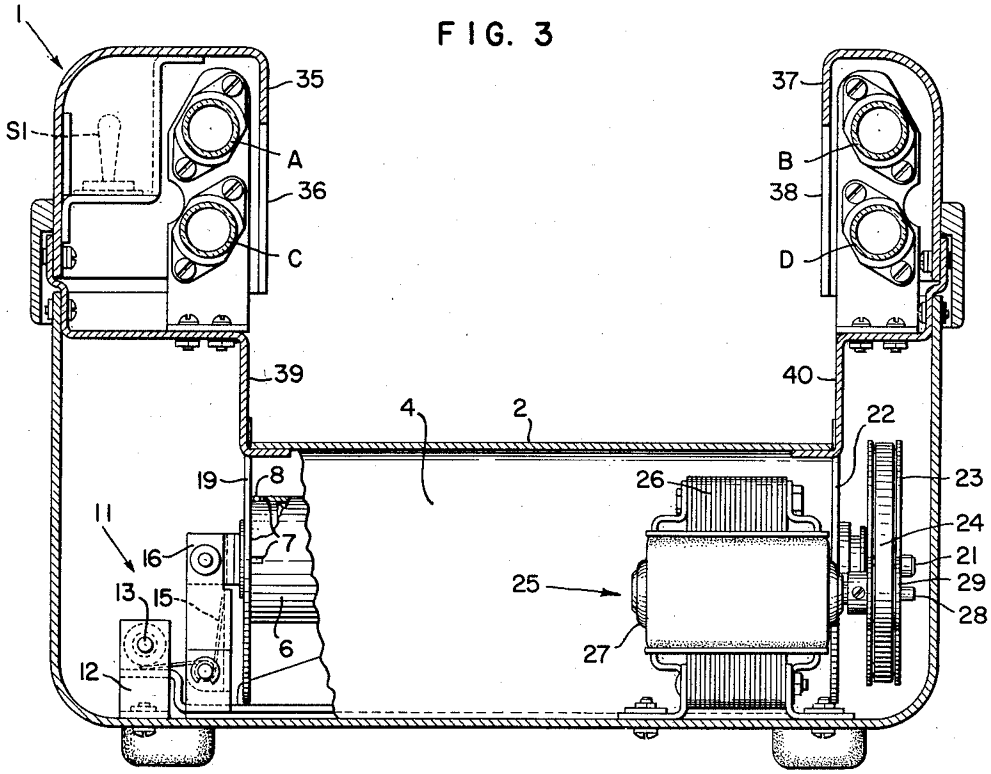
FIG. 3 is a vertical, transverse cross-section on the line 3—3 of FIG. 2 as viewed in the direction of the arrows with the left end of the vertical baffle plate broken away to disclose the take-up roll behind it.

The recording medium or film on which the trace or image is recorded may be an aqueous co-precipitation of silver bromide and silver iodide, the latter being between 5% and 15% of the former. Another example of such a film includes silver bromide emulsion which contains silver citrate and/or has an excess of silver nitrate, or may be a similar emulsion which is intended to produce a trace or image by the action of radiant energy alone, capable of utilizing the process known as latensification.

The apparatus of this invention comprises a case, generally indicated 1, and having in it a flat, base plate 2. Plate 2 is provided at its right end with a depending flange 3 adapted for connection with the recording oscillograph which forms the trace or image producing device. The left end of plate 2 connects with the top of a vertical baffle wall 4.

The film from the trace or image producing means passes over the flat plate 2 and out of the case 1. Alternatively, the film may be rolled up on a take-up roll, generally indicated 5. Take-up roll 5 comprises a cylinder 6 having at its ends a plurality of small notches 7 and 9 adapted to interfit with projections such as screws 8 and 10.

One end of take-up roll 5 is mounted on a pivoted support, generally indicated 11. Support 11 comprises a U-shaped bracket 12 attached to case 1 and supporting a pin 13 on which is supported a second U-shaped bracket 14. A spring 15 bears at one end, against bracket 14 and, at its other end, against a bracket 16 mounted on bracket 14 by means of pin 13. Bracket 16 has pivotally mounted in it an axel 18 on which is mounted a disc 19. Projection 8 is secured to disc 19.

The other end of take-up roll 5 is supported on a stationary, vertical wall 20 in which is pivotally secured an axel 21 on which is mounted a disc 22 which supports the projection 10. A pulley 23 is also secured to axel 21.

A positive drive, such as belt 24, connects take-up roll 5 to an electric motor, generally indicated 25. Belt 24 may have cleats on it cooperating with slots in pulley 23 so as to provide a positive engagement between belt 24 and pulley 23.

Motor 25 is an electric induction motor having a stator 26 and a rotor 27 pivotally mounted therein. Rotor 27 has a shaft 28 on which is mounted a pulley 29 over which belt 24 passes.

A tear-off blade, generally indicated 30, comprises a U-shaped bracket 31 secured to case 1 and providing a mounting for a screw 32 which has engagement with flanges 34 projecting from one end of blade 33. Screw 32 thus provides means whereby blade 33 may be raised or lowered vertically.

Figure 4:
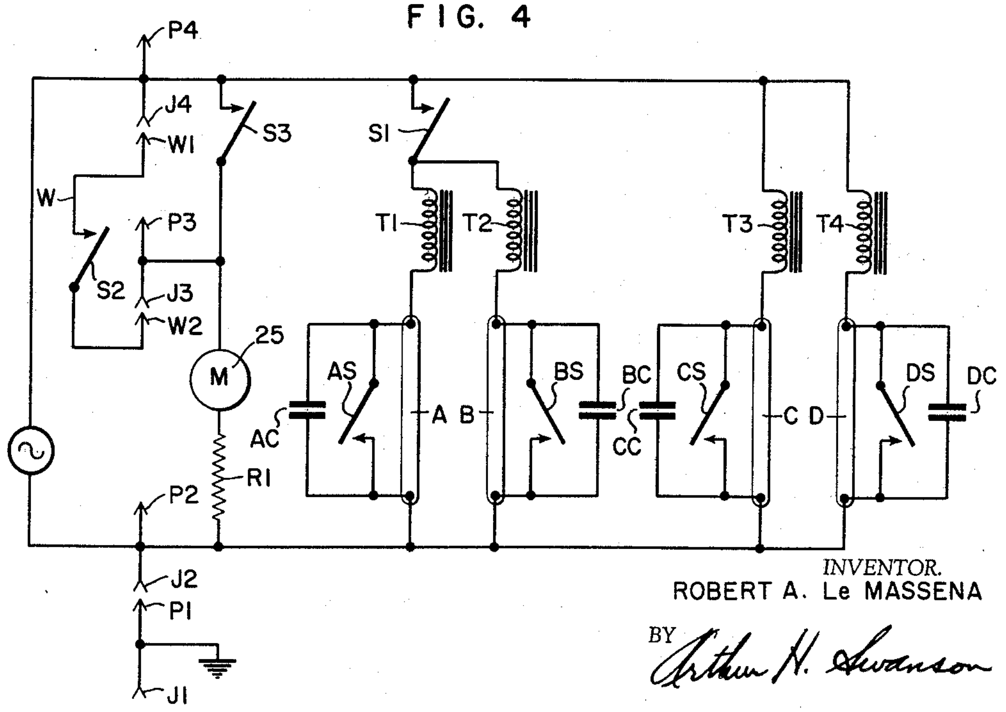
FIG. 4 is an electric circuit diagram of the wiring connections of the device.

FIG. 4 shows the electric circuit connections for the illuminating means comprising the fluorescent lamps A, B. C and D. These means comprise a plug P adapted for connection to a source of commercial electricity. Plug P has pins P1, P2, P3 and P4 together with junctions J1, J2, J3 and J4. Pin P1 is connected to ground. Pins P2 and P4 are connected to the terminals of a source of commercially available electricity, such as ordinary household electricity. A manually operable switch S3 can connect motor 25 and resistor R1 in series across this source of electricity or can disconnect them therefrom. Remote control cord W has on one end thereof a plug WP having a pair of pins W1 and W2, which can be plugged into junctions J3 and J4, so as to connect manually operable switch S2 in parallel with switch S3 to provide a second means of connecting and disconnecting motor 25 and resistor R1. In the actual apparatus of this invention there are two plugs corresponding to the plug P shown in FIG. 4. Plug PA is located in the top of the apparatus. Plug PB is located in the rear wall of the apparatus.

Across pins P2 and P4 of plug P is connected switch S1 having in series with it and in parallel with each other a pair of transformers T1 and T2. In series with transformer T1 and in parallel with each other is a fluorescent lamp A and a starting apparatus comprising a condenser AC and a switch AS. In series with transformer T2 and in parallel with each other are connected lamp B, switch B*s*, and condenser BC. Across the same pair of terminals is connected a transformer T3 having in series therewith and in parallel with each other a lamp C, a switch CS and a condenser CC. Across the same terminals and in parallel with transformer T3 is connected a transformer T4 having in series therewith and in parallel with each other a lamp D, a switch D*s* and a condenser DC.

The terminals across which the transformers T1, T2, T3 and T4 are connected are interconnected with the power supply of the oscillographic recorder which forms the trace or image producing means. Therefore, whenever the trace or image producing means is energized, the lamps C and D are illuminated. Because of the switch S1 the lamps A and B are not illuminated. The lamps C and D provide adequate illumination for viewing the record. The lamps C and D also provide sufficient illumination to perform the post-exposure of the latensification step. The illumination from lamps C and D is not sufficient to degrade the trace or image constituting the record. When the switch S1 is closed, the lamps A and B are illuminated and provide additional illumination for the film when the film is in motion.

The lamps A and C are mounted on one side of case 1 behind wall 35 and aligned with an opening 36 so that the illumination from lamps A and C can pass through opening 36 onto the film on flat plate 2 and provide a substantially uniform illumination thereof. Lamps B and D are mounted in case 1 behind wall 37 having an opening 38 therein which permits the light from lamps B and D to pass onto the film on the flat plate 2 and provide a substantially uniform illumination thereof. Case 1 has walls 39 and 40 which reflect light from lamps A, B, C and D and aid in providing adequate illumination on the film on plate 2.

What is claimed is:

1. Apparatus for conditioning a film to reveal a visible trace or image thereon as rapidly as possible and independently of further processing, which apparatus is adapted for connection to a trace or image producing means, said apparatus including, a case which receives the film after the trace or image has been recorded on it, an electric motor in the case, a spool in the case upon which the film may be wound and which is driven by said electric motor, and a plurality of fluorescent lamps which cast a substantially uniform illumination on the surface of the film before it is wound on the spool, one of these lamps being interconnectible with the power supply of the trace or image producing means so that the lamp is illuminated when the trace or image producing means is energized.

2. Apparatus for conditioning a film to reveal a visible trace or image thereon as rapidly as possible and independently of further processing, which apparatus is adapted for connection to the trace or image producing means, said apparatus including, a case which receives the film after the trace or image has been recorded on it, said case being of generally U-shaped transverse cross-section, a flat base plate at the base of the U, upstanding hollow walls forming the legs of the U, means at one end of the base plate adapted for connection with the image or trace producing means, said film being adapted to pass from said means over said base plate and out of the far end of the case, a cylinder forming a take-up roll for said film and mounted in said case and having small notches in the ends thereof, a disc pivotally mounted in said case and having a projection thereon adapted to enter the notch in one end of said take-up roll, a second disc pivotally mounted in said case and having a second projection thereon adapted to enter the notch in the other end of said take-up roll, an axle secured to second disc and pivotally mounted in said case, a pulley mounted on said axle, an electric motor in said case, a belt connected to the electric motor and said axle so that said electric motor drives said take-up roll, and plurality of fluorescent electric lamps each mounted in the upper portion of one of the legs of said U and adapted to cause a substantially uniform illumination on the surface of the film before it is wound on said take-up roll, said case having openings in the inner walls of the legs of the U permitting light to pass from said lamps to the film on said base plate.

References Cited in the file of this patent

UNITED STATES PATENTS

| | | |
|---|---|---|
| 2,340,684 | Rackett | Feb. 1, 1944 |
| 2,518,208 | Weiss | Aug. 8, 1950 |
| 2,561,342 | Collins | July 24, 1951 |
| 2,708,626 | Yule et al. | May 17, 1955 |
| 2,783,697 | Eisner | Mar. 5, 1957 |
| 2,828,203 | MacWilliam | Mar. 25, 1958 |
| 2,833,190 | Gilmore et al. | May 6, 1958 |
| 2,852,330 | Stufflebeam et al. | Sept. 16, 1958 |
| 2,876,689 | Strange | Mar. 10, 1959 |
| 2,878,739 | Rogers | Mar. 24, 1959 |
| 2,900,889 | Jaffe | Aug. 25, 1959 |
| 2,917,985 | Williamson | Dec. 22, 1959 |